United States Patent

[11] 3,614,733

| [72] | Inventor | Dewey D. Halligan<br>239 Elk St., Santa Cruz, Calif. 95060 |
|---|---|---|
| [21] | Appl. No. | 24,228 |
| [22] | Filed | Mar. 31, 1970 |
| [45] | Patented | Oct. 19, 1971 |

[54] ELEVATED AUTOMOBILE BRAKE LIGHT ON SPRING MOUNT
4 Claims, 5 Drawing Figs.

| [52] | U.S. Cl. | 340/87, 340/71 |
|---|---|---|
| [51] | Int. Cl. | B60q 1/00, B60q 3/00 |
| [50] | Field of Search | 340/71, 87 |

[56] References Cited
UNITED STATES PATENTS
2,920,309  1/1960  Fultz .......................... 340/71 X

*Primary Examiner*—Harold I. Pitts
*Attorney*—Limbach, Limbach & Sutton

ABSTRACT: A high-level stop and signal light has a mounting base which can be mounted on a vehicle's exterior surface such as the roof, rear pillar or rear deck of an automobile. The base holds a ball swivel that is locked in place by a screw, the swivel holding a lamp disposed in the end and shielded from sunlight by an extended hood. The lamp is connected to the automobile brake light system or turn signal system. Upon rapid deceleration of the vehicle the flexible spring section permits the lamp to rise to a more vertical position thus attracting the attention of other motorists.

PATENTED OCT 19 1971 3,614,733

INVENTOR.
DEWEY D. HALLIGAN
BY
ATTORNEYS

ELEVATED AUTOMOBILE BRAKE LIGHT ON SPRING MOUNT

BACKGROUND OF THE INVENTION

The invention relates to vehicle signal light devices and more particularly, to an elevated automobile brake light flexibly mounted so as to attract the attention of motorists in nearby vehicles.

The shocking carnage on the nation's highways has focused ever increasing attention on the development of devices for increasing the safety of operation of motor vehicles. Often, motorists become inattentive to the vehicles ahead of them as the psychological effect of high-speed highway driving tends to induce a type of self-hypnosis. In addition, with the increasing number of vehicles on the highways, especially during rush hour traffic, the brake and signal lights of only the automobile or vehicle directly ahead are visible and a driver does not have sufficient time to react to the brake and signal lights of that vehicle immediately ahead to avoid a rear end collision. Thus, a signal light which on the one hand is capable of attracting additional attention from inattentive drivers and on the other hand is capable of being seen by drivers in a number of cars following in line is highly desirable.

An object of the present invention is to provide a brake light or turn signal indicator on a relatively long shaft in order to place the light in a position that can be seen by other drivers.

A further object is to mount the brake light on a flexible shaft so that the braking action of the vehicle will create a movement in the brake light assembly which will cause it to be more noticeable, thereby attracting attention of other motorists.

A further advantage of the device of the present invention is that the flexibility of the light assembly will tend to prevent damage due to low clearances or possible vandalism.

DESCRIPTION OF THE PREFERRED EMBODIMENTS

In practice a number of mounting positions and combinations of brake lights according to this invention are possible.

Figure 1:
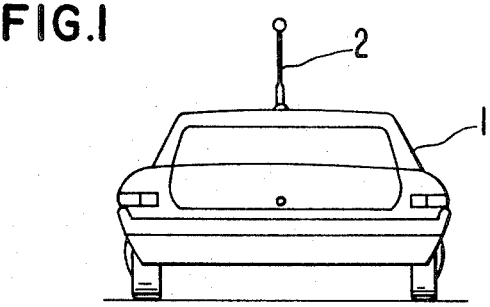
FIG. 1 is a rear view of the vehicle showing an embodiment of the invention mounted on the roof of the vehicle.

Referring now to FIG. 1, the elevated automobile brake light 2 according to the present invention is shown mounted on the roof of a vehicle 1. This mounting permits easy visibility from other vehicles following and, in particular by the drivers in a number of the automobiles following in line closely behind. Since only a single device 2 is used in this embodiment, the lamp contained therein would be connected to the automobile brake light system so that when the brake pedal is depressed the lamp in device 2 will light.

Figure 2:
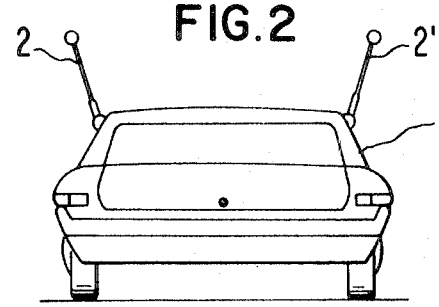
FIG. 2 is a rear view of a vehicle showing a pair of devices according to an embodiment of the present invention mounted on the right-hand and left-hand rear portions of the vehicle roof.
Figure 3:
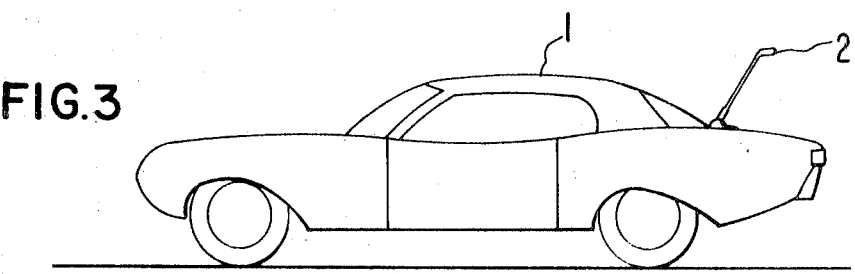
FIG. 3 shows a side view of a vehicle having an embodiment of the invention mounted on the rear deck of the vehicle.

FIG. 2 shows a pair of brake lights 2 and 2' according to the present invention, mounted respectively on the left and right rear roof portions or rear pillar portions of the vehicle 1. In this case, the devices may be connected to the brake light and turn signal systems so that device 2 would indicate braking action and also left turn signaling and device 2' would indicate braking action and right turn signaling.

Figure 4:
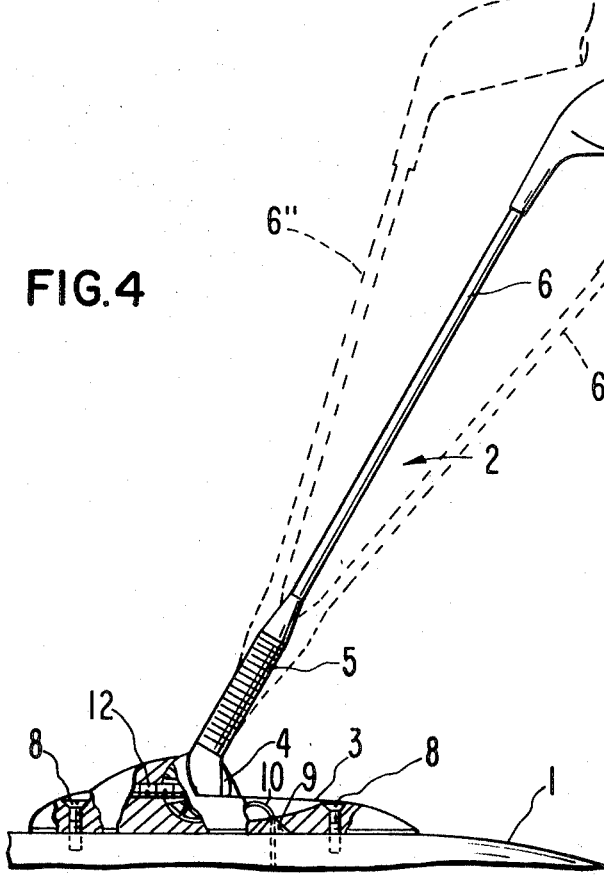
FIG. 4 is a side view, partially cut away, of an embodiment of the present invention.
Figure 5:
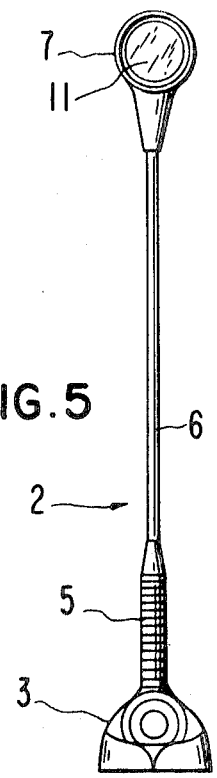
FIG. 5 is a rear view of an embodiment of the present invention.

Referring now to FIG. 4 and 5, the detail of the elevated automobile brake light according to the present invention is shown having a base or standard 3 that is fixedly attached to vehicle 1 as by a set of screws 8. The base 3 contains a ball swivel 4 which may be locked in place by fixing means such as screw 12. The elongated lamp is attached to ball swivel 4 and comprises a flexible spring section 5. A supporting rod 6 is connected to the spring sections and holds an extended hood 7 in which a lamp 11, such as a high-intensity red light, is mounted.

The length of rod 6 may be chosen to provide sufficient height depending on the mounting location shown and at the same time, where state law limits the maximum height of a brake light, assure a specified height when the light springs to vertical position on hard braking.

A ball swivel 4 connection to the base 3 and to the spring section 5 is such that when the device is mounted on a vehicle the rod is inclined from the verticle rearwardly of the vehicle. The spring section 5 has a flexibility chosen so as to permit the rod 6 to spring forward and the light to rise as the vehicle is braked hard for rapid deceleration. The choice of a spring will depend upon the size and weight of the rod 6 and the hood and light portion. The dotted portions of FIG. 4 indicate different positions of the device under different vehicle operating conditions.

When the vehicle is moving under acceleration or at reasonable speed encountering wind resistance the rod will be inclined rearwardly as indicated at 6'. Upon removal of the driver's foot from the accelerator and as the automobile slows down the rod will return from position 6' to normal position 6. With braking the supporting rod will incline forward from position 6 more toward the vertical as shown at 6''. Thus the inclination of the rod 6 and the height of hood 7 are an indication of the drivers actions.

An electrical connection for lamp 11 runs down through tube 6 through the flexible spring and is shown as wire 10 entering the vehicle body through a seal and gasket 9. The seal and gasket prevent water leakage into the vehicle.

The invention thus described provides a brake light mounted sufficiently above the normal light so as to be easily visible by motorists in following cars, and the relative motion particularly the elevation of the brake lamp upon braking serves to attract the attention of these following motorists.

The extended hood 7 serves to prevent sun and overhead light from reflecting from the lamp 11 and giving false illumination indication. In addition, the adjustable swivel permits mounting the device at any angle desired to the surface of the automobile. The device is easily installed and has very little or no maintenance. It is low in cost and can be used on generally all presently manufactured vehicles, and the physical size of the device is such as not to greatly change the appearance of the vehicle on which it is mounted.

I claim:

1. An elevated vehicle brake light comprising:
    an elongated rod,
    a flexible spring mounted on one end of said rod,
    means for securing said flexible spring to a vehicle, with said elongated rod inclined from vertical rearwardly of the vehicle, a lamp, and
    means for securing said lamp to the free end of said rod.

2. An elevated vehicle brake light comprising:
    an elongated rod,
    a flexible spring mounted on one end of said rod,
    a ball swivel secured to the free end of said spring,
    base means for adjustably holding said ball swivel,
    means for securing said base means to a vehicle, a lamp, and
    means for securing said lamp to the free end of said rod.

3. The apparatus of claim 2 wherein said base means comprises
    a standard assembly for holding said ball swivel and having a screw therein for securing said ball swivel.

4. The apparatus of claim 2 including an extended hood of generally cylindrical shape surrounding the sides of said lamp for shading external light from said lamp.